(12) United States Patent
Della-Torre

(10) Patent No.: US 7,577,432 B2
(45) Date of Patent: Aug. 18, 2009

(54) BLOCKING NETWORK SELECTION REDIRECTION ATTEMPTS IN ROAMING

(75) Inventor: Reuven Della-Torre, Ramat-Gan (IL)

(73) Assignee: StarHome GmbH, Zurich (CH)

( * ) Notice: Subject to any disclaimer, the term of this patent is extended or adjusted under 35 U.S.C. 154(b) by 318 days.

(21) Appl. No.: 11/226,421

(22) Filed: Sep. 15, 2005

(65) Prior Publication Data

US 2006/0068778 A1 Mar. 30, 2006

Related U.S. Application Data

(60) Provisional application No. 60/609,810, filed on Sep. 15, 2004.

(51) Int. Cl.
*H04Q 7/20* (2006.01)
(52) U.S. Cl. .............. 455/432.1; 455/435; 455/552; 455/434; 455/414; 455/412; 455/456; 455/452.1
(58) Field of Classification Search .............. 455/432.1, 455/436, 448, 435.2, 433
See application file for complete search history.

(56) References Cited

U.S. PATENT DOCUMENTS

| 2004/0087305 | A1* | 5/2004 | Jiang et al. ............... 455/432.1 |
| 2004/0224680 | A1 | 11/2004 | Jiang |
| 2005/0070278 | A1 | 3/2005 | Jiang |
| 2005/0186950 | A1 | 8/2005 | Jiang |

FOREIGN PATENT DOCUMENTS

| WO | WO 2004/014101 | 2/2004 |
| WO | WO 2004/075484 | 2/2004 |
| WO | WO 2004/075579 | 2/2004 |
| WO | WO 2004/075598 | 2/2004 |
| WO | WO 2005/017693 | 2/2005 |
| WO | WO 2005/018245 | 2/2005 |
| WO | WO 2005/081962 | 9/2005 |
| WO | WO 2005/086927 | 9/2005 |

OTHER PUBLICATIONS

Digital Cellular Telecommunication System (Phase 2+) (GSM); UMTS; Technical Report on the gatway Location Register (3GPP TR 23.909 version 4.0.0 Release 4); ETSI TR 123 909, ETSI Standards, Mar. 2001 XP014005055.*
ETSI "Digital Cellular Telecommunications System (Phase 2+) (GSM); Universal Mobile Telecommunications System (UMTS); Technical Report on the Gateway Location Register (3GPP TR 23.909 Version 4.0.0 Release 4); ETSI TR 123 909", European Telecommunications Standards Institute, 3-CN2, 3-CN4(V400): 1-59, 2001 p. 7-8, 10-12.

(Continued)

*Primary Examiner*—Charles N Appiah
*Assistant Examiner*—Randy Peaches

(57) ABSTRACT

An apparatus for blocking of redirection attempts by a home network when a mobile unit roams in a visited network. The apparatus comprises: a detector, configured for detecting a roaming transaction by a mobile unit of a visiting user and a respective redirection attempt of the mobile unit from the visited network by a home network of the visiting user, and further comprising a redirection blocker, associated with the detector and configured for blocking the redirection attempt.

33 Claims, 11 Drawing Sheets

OTHER PUBLICATIONS

European Official Communication Dated Jul. 31, 2008 From European Patent Office Re.: Application No. 05784373.2.
International Preliminary Report on Patentability Dated Mar. 29, 2007 From the International Bureau of WIPO Re.: Application No. PCT/IL2005/000995.
International Search Report Dated Jan. 5, 2006 From the International Searching Authority Re.: Application No. PCT/IL2005/000995.
Invitation to Respond to Written Opinion Dated Apr. 17, 2008 From the Intellectual Property Office of Singapore Re.: Application No. 200701933-4.
Written Opinion Dated Jan. 5, 2006 From the International Searching Authority Re.: Application No. PCT/IL2005/000995.
IPRP CH I of Mar. 29, 2007.
OA Apr. 17, 2008.

* cited by examiner

Blocking Network Redirection at the VPMN

BLOCKING NETWORK SELECTION REDIRECTION ATTEMPTS IN ROAMING

RELATED APPLICATION

The present application claims the benefit of U.S. Provisional Patent Application No. 60/609,810, filed on Sep. 15, 2004, the content of which is hereby incorporated by reference.

FIELD AND BACKGROUND OF THE INVENTION

The present invention relates to selection of a preferred network for roaming and, more particularly, but not exclusively to a method or system for blocking network selection redirection attempts in roaming.

There are many mobile or cellular network operators, or providers, in the world, usually more than one in a single country. These network operators include, but are not limited to, operators who provide mobility services using GSM, GPRS, 3G, CDMA, TDMA, PHS, WCDMA, IDEN and WLL technologies or their variants. These network operators provide voice and data services to their own subscribers and to subscribers from other networks. When the network operator provides service to a subscriber from a foreign country, it is referred to as "international roaming". When the network operator provides service to a subscriber from another network in the same country, it is referred to as "domestic roaming".

A cellular network with which a cellular subscriber has a direct billing relationship is often referred to as the Home Public Mobile Network (HPMN) or as the home network of the subscriber. If the subscriber is in a network with which it does not have a direct billing relationship, the serving network is referred to as the Visited Public Mobile Network (VPMN) or as the visited network. The subscriber is referred to as an in-roamer by the VPMN. The same subscriber is referred to as an out-roamer by the HPMN. In such a case, the in-roamers are treated as temporary subscribers from a service availability perspective, while the billing for usage incurred by them is through inter-carrier settlements via the home network of the subscriber.

Over the last few years, the revenues to network operators from home subscribers have consistently declined due to increased competition and resultant pricing pressures. On the other hand, revenues from roamers have consistently grown in the same period due to increased mobile penetration in local markets and an increase in travel. Moreover, roaming revenues are high-margin revenues that typically comprise between 8-25% of the total network operator revenues. Hence, protecting the existing roaming revenues and growing them further has become an important priority for the network operators worldwide.

VPMN operators, aware of the growing significance of in-roamer revenues for their profitability, make their best to protect and further grow their share of roaming revenues, gained from in-roaming in their service covered areas. An in-roamer himself may also have his own preferences, based on attractive roaming rates, availability of services, etc.

HPMN operators have preferences with regards to different VPMNs to be used by their subscribers when roaming abroad. Many network operators have partnership agreements with each other that include more favorable roaming charges between then. Some operators also own or are business-grouped with networks in various countries. These operators would like to make sure their out-roamers stay within the group, or roam in preferred networks.

There are currently some products in the mobile cellular market which help HPMN operators redirect network selection of roaming mobile cellular phones. Such products are offered, for example, by StarHome Inc.

These products are typically based on the idea that a system deployed in association with the HPMN (the home network) is used to issue various rejection messages m response to registration attempts of roamers trying to register to a VPMN which is not preferable as far as the operator of the HPMN is concerned. Such a rejection message causes a mobile unit/handset in an automatic network selection mode to search for another network. The other network may also be rejected by the HPMN using such rejection messages, and so forth, until a HPMN preferred network is found.

In GSM networks, these products monitor and optionally reject update location SS7/MAP messages that are used as registration messages to the VPMN, sent to the HPMN from the mobile unit. The product may be based on a monitor or probe placed on the SS7/MAP signaling lines.

Alternative products send a list of available networks in order of preference to the individual handset. The list is typically provided by Over the Air SIM update and is combined with a SIM applet. The list is used by the handset to search for available VPMNs in order. Reference is now made to FIG. 1, which is a block diagram illustrating the deployment of a unit for network redirection, in the HPMN side, according to prior art.

In an exemplary deployment of a prior art redirection unit, a redirection unit 120 may be deployed in the home network (HPMN) of the mobile unit. The redirection unit may comprise a probe part 130.

The probe part 130 picks up passing signals to carry out detection of roaming activity by mobile units, such as unit 140, in a roaming environment 150, such as a foreign country to which home network 110 does not extend.

The home network 110 is the network which the roaming unit 140 is subscribed to. The roaming environment 150 includes a number of mobile networks, VPMN 1-3 in this example, which are technologically compatible with the roaming mobile unit 140 and which the roaming mobile unit 140 may use.

The home network 110 may have preferences over the VPMNs, for example, the home network 110 may prefer a network which belongs to the same parent company. Utilizing the redirection unit 120, the home network 110 may attempt to manipulate the mobile unit 140 into selecting a network which it regards as preferable.

The redirection unit 120 may send a manipulative output, through an output port 190. The manipulative output may include a rejection message sent in response to the detected roaming activity for a non-preferred network, say VPMN 1 in the given example. Upon a predetermined number of attempts to roam in VPMN 1, the mobile unit 140, in an automatic network selection mode, automatically searches for another network, until finding a second available network, say VPMN 2.

The second network may also be non-preferable as far as the home network 110 is concerned, and the redirection unit 120 may redirect the mobile unit 140 from this network as well, and so forth until a network which is preferable to the home network is finally reached (VPMN 3 in the given example), thus successfully completing a redirection of the roaming mobile unit 140.

Reference is now made to FIG. 2 which is a flow chart illustrating an exemplary redirection process, in a GSM environment, by the home network (HPMN), according to prior art.

When a visited network (VPMN) network communication base station receives a registration message—an update location (UL) MAP message from the mobile handset 210, trying to roam in the VPMN, the message is forwarded to a Visitors Location Register (VLR) 220, which is a local database maintained by the VPMN to track visiting mobile unit users while the users are roaming in the VPMN.

The HPMN is communicated with the update location message 230, for registering the location of the mobile unit in a HLR—The main database of permanent subscriber information for the HPMN.

A responding rejection message is then sent 240 to the VLR in the VPMN from a Home Location Register (HLR) of the HPMN, or from a redirection system, emulating the HLR for this purpose, which is deployed in the HPMN.

The rejection message is then forwarded to the mobile unit (MU) 250.

The mobile unit/handset (MU), in an automatic network selection mode, is preconfigured by standard to automatically issue a preset standard number of attempts to register for the visited network by repetitive sending of the UL message for the VPMN to the home network 260.

According to a GSM standard, a mobile unit is preconfigured to issue four such registration attempts, and then search for another network. The reason for this is that users have the facility to hand-pick the desired network. The standard requires providers to honor the handmade selections of the users.

The home network thus manipulatively rejects these UL messages, and the mobile unit is maneuvered to search for another VPMN network in this successful redirection 290. A second found VPMN, in its turn, may also be rejected by the HPMN, and so forth until a HPMN preferred network is finally found.

As mentioned above, handsets are provided with a mode in which the user is able to manually select a network. In this manual mode, the mobile unit/handset shows a list of available networks to the user. The user selects one of the available networks and the handset attempts registration onto that network. If the registration is not successful, the handset waits for a predetermined delay and tries again. According to a GSM standard, in non-manual modes the number of retries is limited to four, so that a fifth retry may be recognized as manual mode. However, if specific handsets are configured to a different number of retrials than four, say five, the HPMN system may be configured accordingly, say to six, for this type of handsets. In manual mode, the user himself has selected a particular network, so preferred VPMN selection from the HPMN perspective should not apply and the HPMN deployed redirection unit is expected to honor the will of the handset user.

However, a majority of current handsets are kept in automatic selection mode as the manual mode is not known to most users, and the HPMN is keen on controlling or influencing the selection of a VPMN.

In any event, with the deployment of such network selection systems at the HPMN, both the operator of the VPMN and the roaming user are left dependent on the HPMN systems when trying to exercise fair competition and the freedom to choose among different networks.

There is thus a widely recognized need for, and it would be highly advantageous to have, a system or method for the selection of a preferred network for roaming which is devoid of the above limitations.

SUMMARY OF THE INVENTION

According to one aspect of the present invention there is provided an apparatus for blocking of redirection attempts at a visited network selection by a home network when roaming in the visited network, the apparatus comprising: a detector, configured for detecting a roaming transaction by a mobile unit of a visiting user and a respective network redirection attempt by a home network of the visiting user, and a redirection blocker, associated with the detector and configured for blocking the redirection attempt.

According to a second aspect of the present invention there is provided a method for blocking of redirection attempts at a visited network selection by a home network when roaming in the visited network, the method comprising: detecting a roaming transaction by a mobile unit of a visiting user and a respective network selection redirection attempt by a home network of the visiting user, and blocking the redirection attempt.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
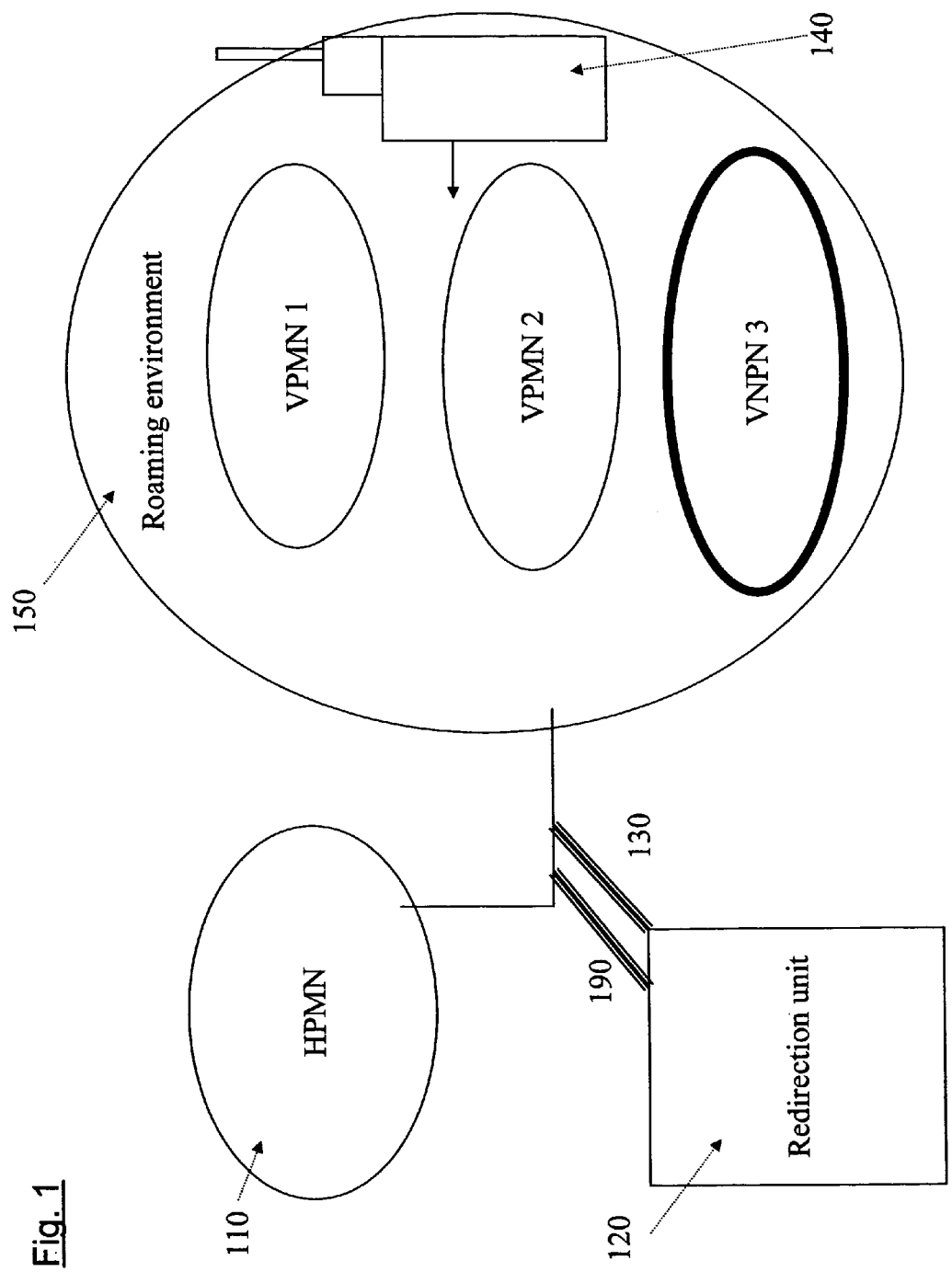
FIG. 1 is a block diagram illustrating the deployment of a unit for network redirection, in the HPMN side, according to prior art.
Figure 2:
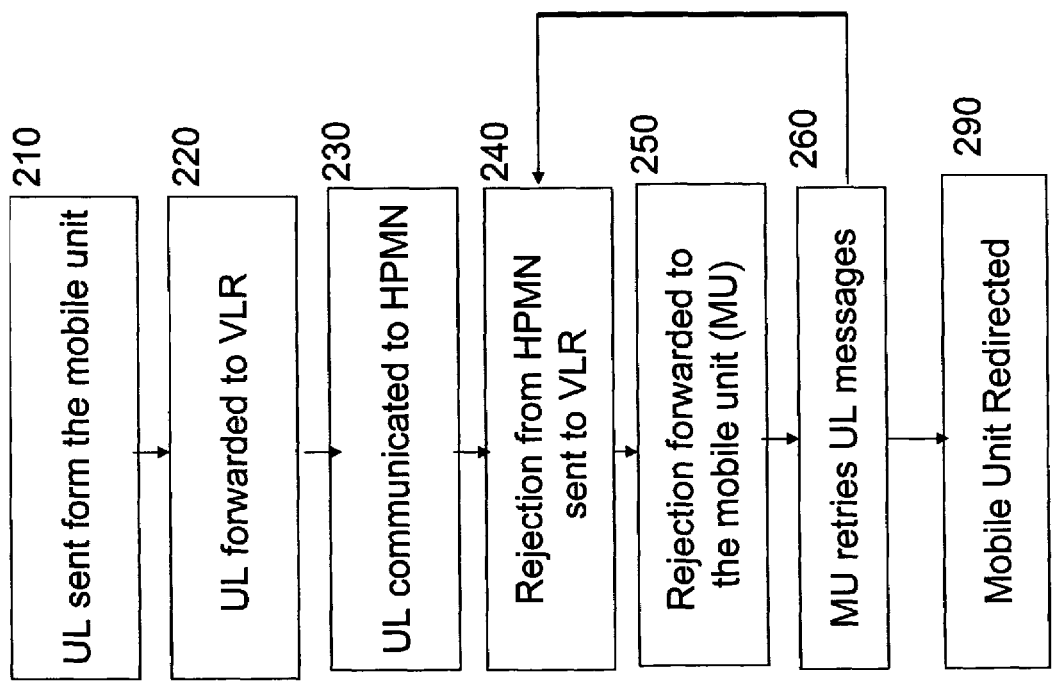
FIG. 2 is a flow chart illustrating an exemplary redirection process, in a GSM environment, by the home network (HPMN), according to prior art.

The present embodiments comprise an apparatus and method for blocking redirection attempts at a visited network selection by a home network when roaming in a visited network.

The principles and operation of an apparatus and a method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The present invention aims at helping a visited network protect against network selection redirection attempts. Such attempts are usually based on issuing of manipulative rejection messages from the side of a home network (HPMN) of a mobile unit, in response to a detected roaming transaction of a mobile unit of a subscriber of the home network (HPMN) in another network. Such a roaming transaction may involve trying to register in a visited network which is not preferable as far as the HPMN operator is concerned.

For example, a cellular user who is a subscriber of a cellular network (HPMN) in his home country, may visit another country, and try to use a cellular network in the other country (VPMN). Such a roaming transaction—an attempt to make a cellular voice phone call, send a text message, surf the internet, etc. starts with a registration message, sent to the home network (HPMN).

As described hereinabove, the home network may have preferences with regards to roaming network selection by the roaming user. However, the preferences of the home network may contradict the preferences of the user.

These redirection attempts are based on the fact that cellular phones in an automatic network search mode are configured by standard to retry registering their presence in a specific visited network location for a limited predefined maximal number of times, and then try to register to another network, according to a programmed set of rules and the availability of such networks.

For example, according to a GSM network standard, the maximal number of such registration messages in a single roaming transaction is set to four.

In these redirection attempts, the home network sends manipulative rejection messages, in response to the registration messages. These manipulative rejection massages are used to maneuver the mobile unit, being in an automatic network search mode, which is usually the case, into receiving a sequence of the maximal number of rejections, and then automatically switching to another network, and so forth until a preferred network, preferred that is from the perspective of the home network provider, is registered.

With preferred embodiments of the present invention, as deployed in a visited network (VPMN), described hereinafter, these manipulative redirection attempts are blocked.

With the apparatus and method according to a preferred embodiment of the present invention, these attempts are dealt with by detecting a roaming transaction in the visited network (VPMN) and a respective redirection attempt by the home network (HPMN) of the in-roaming mobile unit user, and blocking the redirection attempt. The blocking of the redirection attempt is carried out utilizing capacities of to monitor, intercept, cancel, change, and issue messages that pass into, through, and out of the VPMN.

Figure 3:
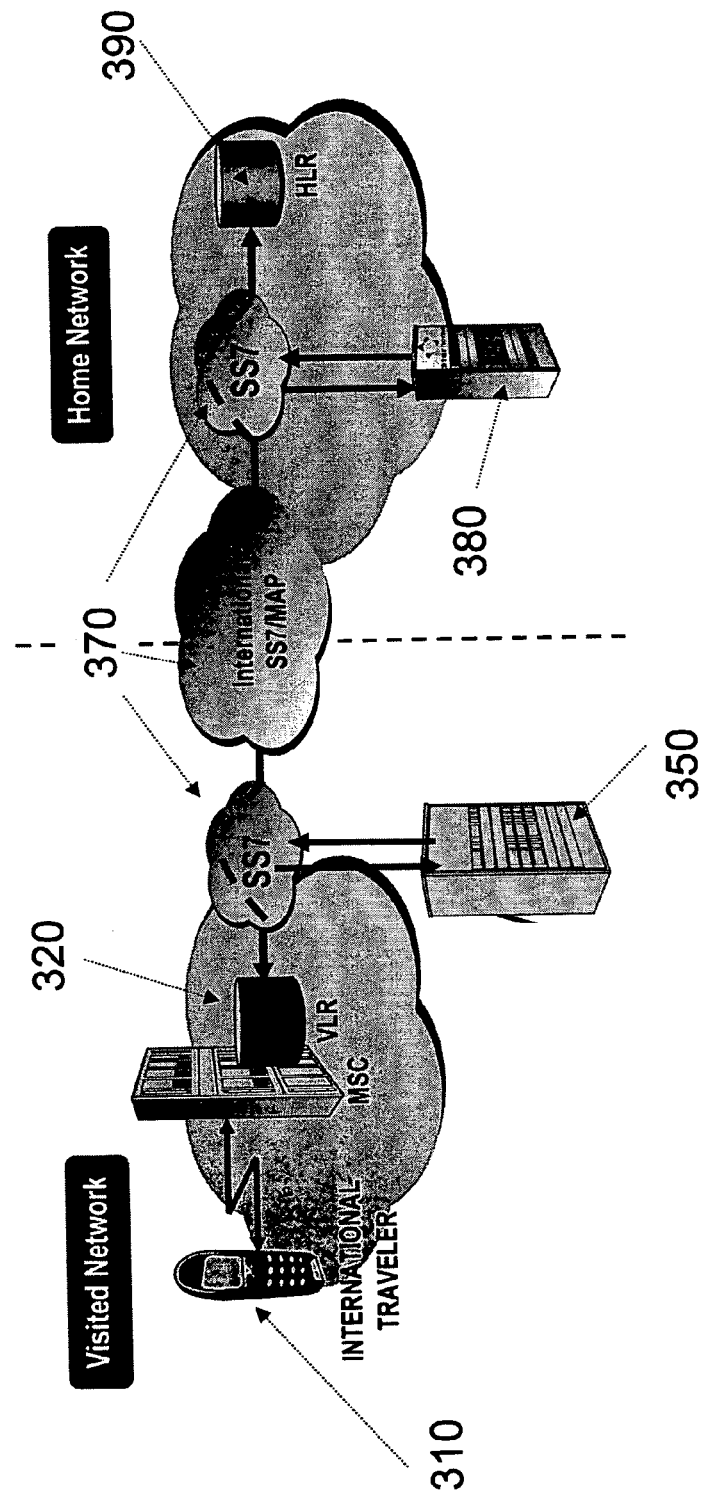
FIG. 3 is a schematic diagram illustrating an exemplary architecture of connected home network (HPMN) and visited network VPMN, according to a preferred embodiment of the present invention.

Reference is now made to FIG. 3 which is a schematic diagram illustrating an exemplary architecture of connected home network (HPMN) and visited network VPMN, according to a preferred embodiment of the present invention.

In this example, a mobile unit 310 is used by an international traveler who tries to make a cellular phone call in a visited network (VPMN) which is non-preferable as far as the operator of his home subscribed network (HPMN) is concerned.

The mobile unit issues a Location Update message which is received by the Visitors Location Register (VLR) 320 of the visited network. A corresponding MAP Update Location message is then sent through SS7/MAP links 370 to a HLR 390 of the HPMN.

In this exemplified architecture, the home network (HPMN) is installed with a redirection system 380. The exemplary redirection system 380 is connected to the SS7/MAP links 370 which connect the two networks, for detecting roaming transactions of subscribed users of the HPMN in other networks.

Upon detecting such a roaming transaction into a network which is non-preferable to the home network operator, the redirection system 380 launches a redirection attempt, aimed at diverting the roaming transaction into a more preferable network. The redirection attempt may be carried out by sending manipulative rejection messages, as described hereinabove.

However, in a preferred embodiment of the present invention, the visited network (VPMN) is equipped with a redirection blocking apparatus 350. The redirection blocking apparatus 350 is connected to the SS7/MAP links 370 for detecting a roaming transaction initiated in the VPMN and an attempt of the home network of the mobile unit to redirect the roaming transaction into another network.

Upon detecting the roaming transaction and the attempt at redirecting it initiated by the home network of the mobile unit 310, the redirection blocking apparatus 350 tries to block the redirection attempt. Optionally, the blocking of the redirection attempt may include canceling messages, converting messages, initiating messages, or any combination thereof.

Figure 4:
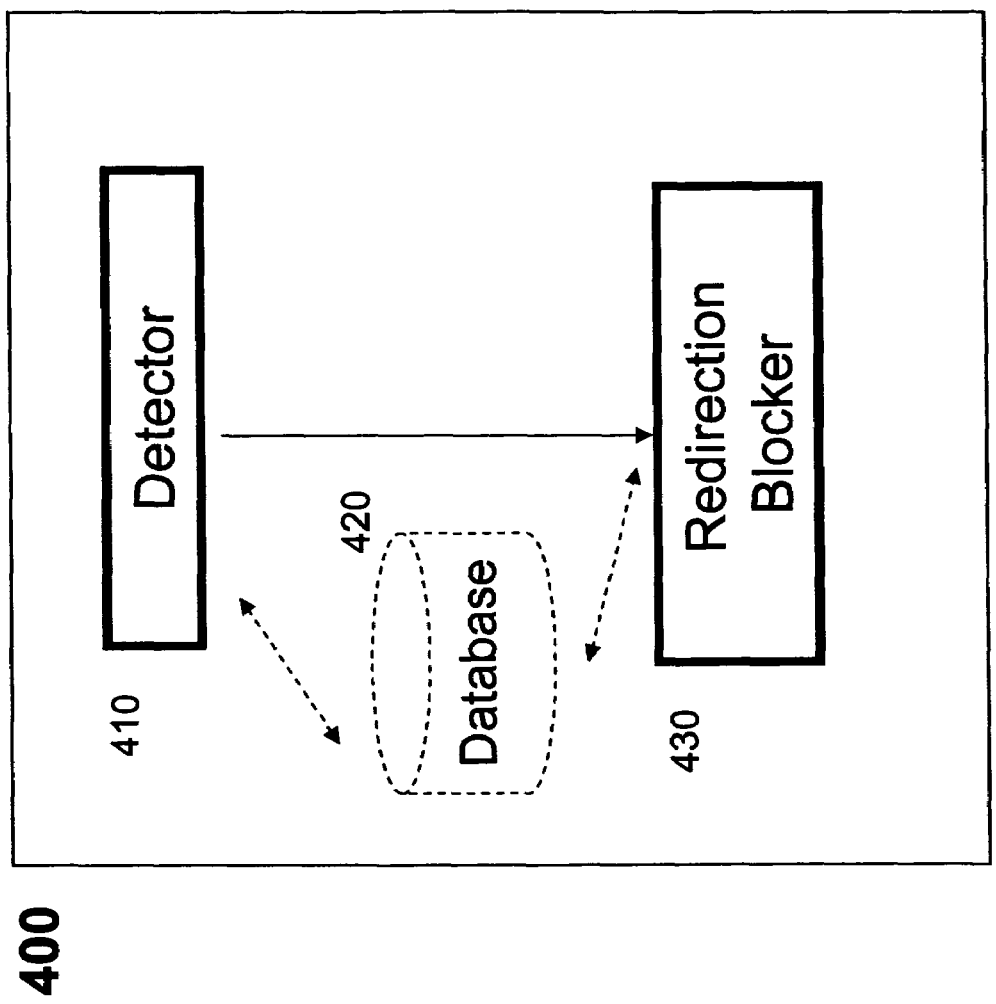
FIG. 4 is a block diagram of an apparatus for blocking of redirection attempts according to a preferred embodiment of the present invention.

Reference is now made to FIG. 4 which is a block diagram of an apparatus for blocking of redirection according to a preferred embodiment of the present invention.

The apparatus 400, according to a preferred embodiment, includes a detector 410 which is configured for detecting roaming transactions of a mobile unit user and attempts at redirection of the selection of a visited/roaming network (VPMN) by the roaming mobile unit.

The redirection attempt is initiated by the home network in response to the roaming activity using known in the art roaming activity redirection systems, as described hereinabove.

Preferably, the apparatus 400 may also be equipped with a database 420. The database 420 may be associated with the detector 410. Preferably, the database 420 may be further configured to record and store information regarding the messages sent during each roaming transaction. Preferably, the database 420 may be further configured to record rejection messages issued for the roaming transaction, from the home network of the user and received in the visited network where the mobile unit roams.

The database 420 may be further configured to store any other relevant information that may be useful for blocking the redirection attempts.

The apparatus 400 is further equipped with a redirection blocker 430, associated with the detector 410 and optionally with the database 420 as well. The redirection blocker 430 is configured for carrying out the blocking of the redirection attempts which are initiated by the HPMN.

In a preferred embodiment of the present invention the networks are GSM networks. With GSM, the home network (HPMN) may use one of known in the art products for redirecting network selection by a mobile unit/handset when the user/roamer tries to register to a visited network (VPMN) which is regarded as non-preferable by the HPMN.

In a GSM network, these products issue a manipulative rejection message in response to a MAP update location (UL) message, sent from a candidate roaming Visitors Location Register (VLR) of the VPMN to a Home Location Register (HLR) in the HPMN.

When the registration attempt is rejected by the HPMN, the VLR at the visited network reports the rejection to the mobile unit. The mobile unit attempts another registrations for the same VPMN, until the maximal number of consecutive registrations for a roaming/visited network (VPMN) is reached. As described hereinabove, the maximal number is set to four according to a GSM standard, so that a fifth retry may be recognized as manual mode user selection that the HPMN is expected to honor.

If the home network receives an additional registration attempt (a fifth in the standard GSM case) for the same roaming/visited network, the redirection system installed in the HPMN must issue an acceptance message for the additional update location message, so as to honor the will of the user, as the HPMN thinks the fifth signal is indicative of a manual selection.

However this last and successful registration is seldom reached with the prior art, as most mobile phones are preset to an automatic network selection mode where the phone only tries the maximal times (four times with GSM), and then automatically shifts to another available network.

With the introduction of the apparatus 400 according to a preferred embodiment of the present invention, the redirection attempts of the home network may be blocked. More specifically, the redirection attempts that include manipulative rejection messages sent form the HPMN are dealt with by the apparatus 400, so as to prevent them from maneuvering the mobile unit, when in automatic modem, into shifting to another network.

In a preferred embodiment of the present invention, the apparatus 400 monitors all international links. With a GSM network these links are MAP/SS7 based links.

Preferably, the apparatus 400 has the functionality of a Signaling Relay Module (SRM), i.e. the ability to intercept MAP/SS7 messages that are detected by the receptor 410.

Preferably the messages are recorded and stored in a database 420.

Optionally, some of the intercepted messages are then modified or canceled by the redirection blocker 430.

This SRM functionality may help monitoring the update location messages sent by the actual VLR, for intercepting and canceling (if required) the update location reject messages coming from the HPMN.

In addition, the apparatus 400 preferably has the ability to initiate new SS7 MAP messages.

During its operation, the apparatus 400 implements the methods described herein below, using FIG. 6-11, for detecting the messages transferred between the mobile unit and the HPMN, and blocking redirection attempts.

Figure 5:
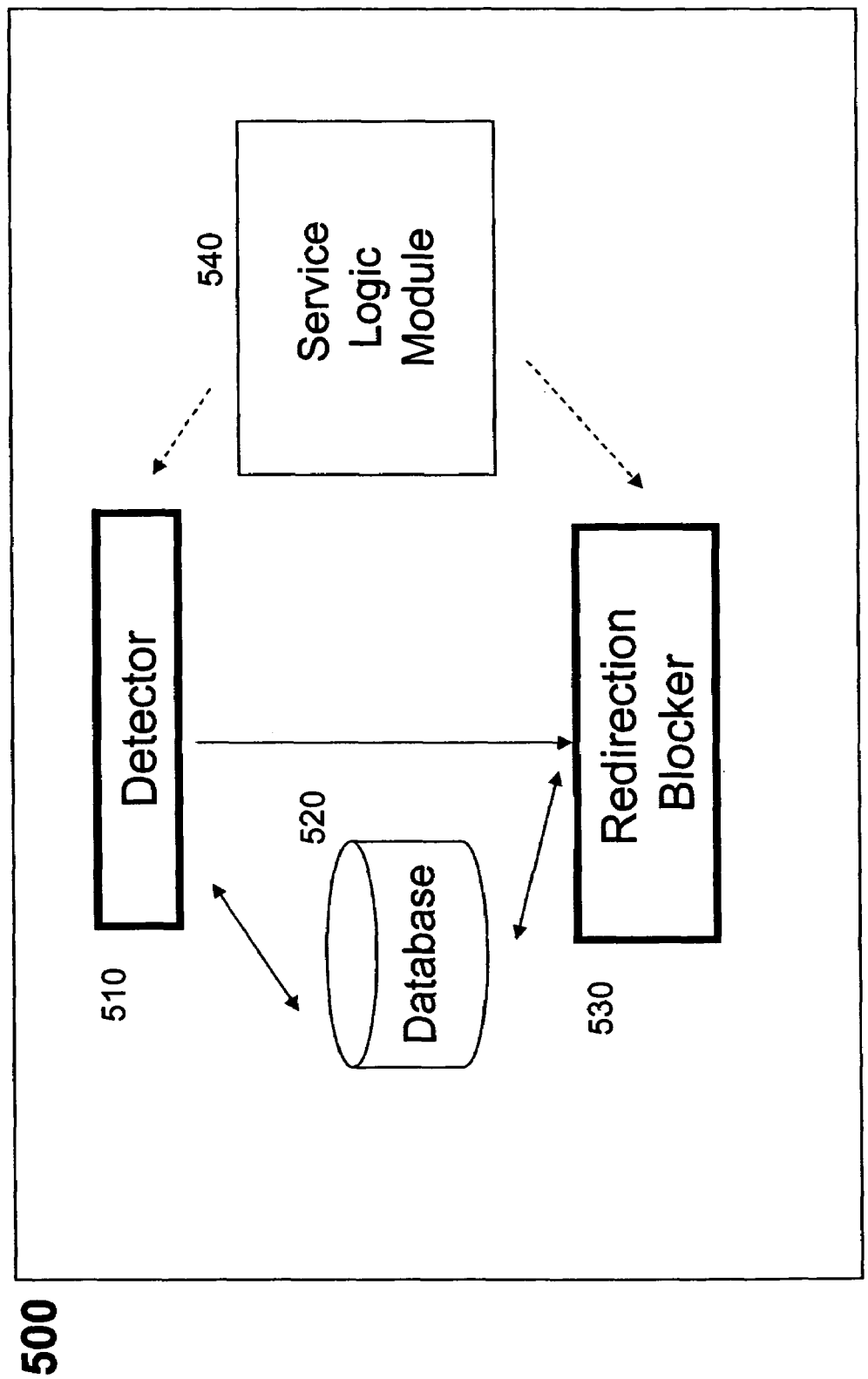
FIG. 5 is a block diagram of a second apparatus for blocking of redirection attempts according to a preferred embodiment of the present invention.

Reference is now made to FIG. 5 which is a block diagram of a second apparatus for blocking redirection attempts, according to a preferred embodiment of the present invention. The second apparatus 500 includes the components 510-530 which are similar to the respective 410-430 components depicted in FIG. 4.

In addition, in a preferred embodiment, the apparatus 500 further has a service logic module 540 for performing service logic. The service logic may include but is not limited to functionality for determining how to treat the reject messages coming from the HPMN, for handling rejection messages of different severity etc.

During its operation, the apparatus 500 implements the methods described herein below, using FIG. 6-11, for detecting the messages transferred between the mobile unit and the HPMN, and blocking redirection attempts.

Figure 6:
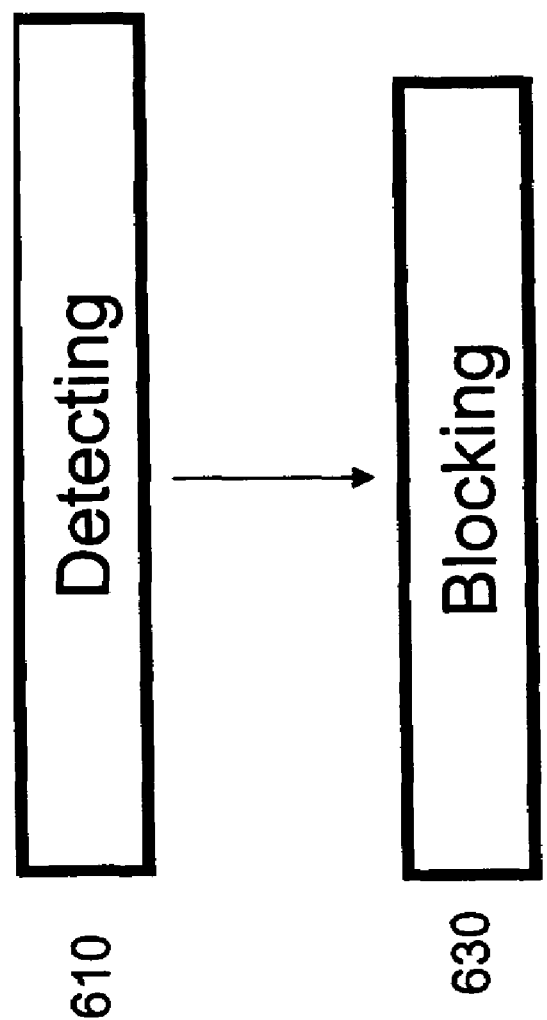
FIG. 6 is a generalized flow diagram of a first method for blocking redirection attempts according to a preferred embodiment of the present invention.

Reference is now made to FIG. 6 which is a generalized flow diagram of a first method for blocking redirection attempts, according to a preferred embodiment of the present invention.

In the first step of this preferred embodiment method, a roaming transaction by a mobile unit of a visiting user (such as a cellular voice phone call made by the user when vacating abroad) and a respective network selection redirection attempt by a home network of the visiting user (as may be facilitated by the existing redirection products, as described hereinabove) are detected 610, say by the above described detector 410.

Preferably, the method may further include recording information relating to the roaming transaction and the redirection attempt thereof, as well as any other relevant information.

Finally, the redirection attempt is blocked 630. Optionally, information recorded during the detection may be used for blocking, for example—when initiating certain messages which are based on a content of an initial registration attempt issued as a GSM MAP update location message, sent from a mobile unit to the home network, while roaming in the VPMN, as described in greater detail herein below.

The following are more detailed embodiments of the above described method.

Figure 7:
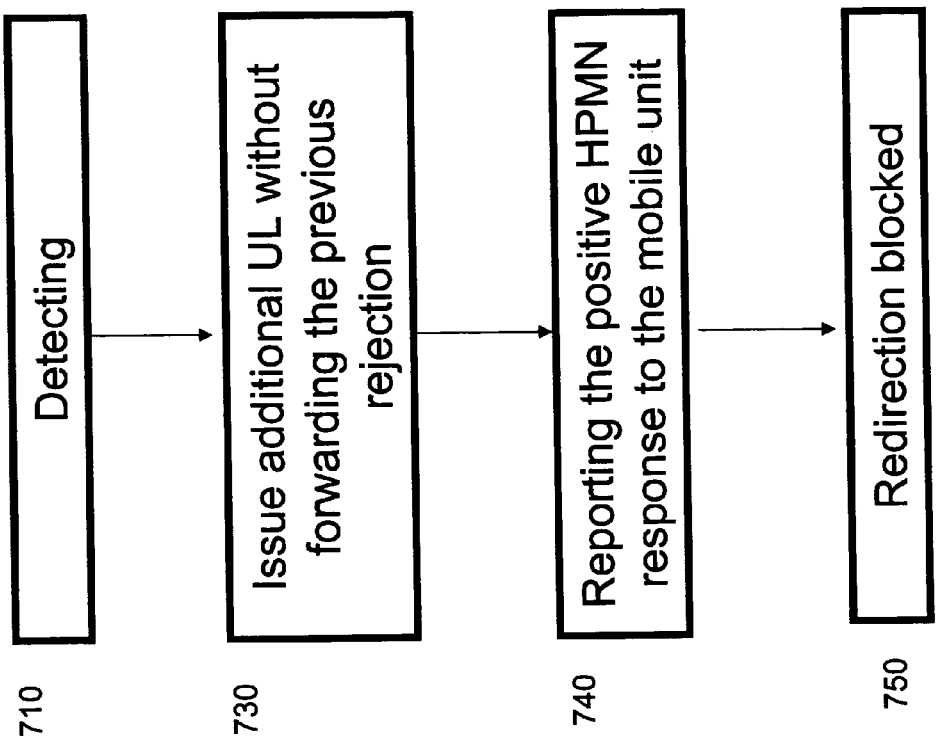
FIG. 7 is a flow diagram of a second method for blocking redirection attempts according to a preferred embodiment of the present invention.

Reference is now made to FIG. 7 which is a flow diagram of a second method for blocking redirection attempts according to a preferred embodiment of the present invention.

This preferred embodiment is explained within a concrete GSM network example. However the present invention may be implemented in any type of cellular network.

The first stage involves detecting 710 a roaming transaction issued by a mobile unit of a roaming user, in the VPMN, which may start with a registration message—a GSM MAP update location (UL) message, and a respective rejection message thereof, issued and sent from the HPMN, in a redirection attempt. The detecting may be carried out by a detector 410, as described hereinabove.

A blocking of the redirection attempt is then carried out by automatically issuing an additional update location (UL) message 730. The additional message is sent towards the HPMN of the roaming mobile unit, without forwarding the previous rejection message to the mobile unit. Optionally, the additional UL message is issued by a blocker 430, as described hereinabove.

As described hereinabove, the mobile unit/handset, in an automatic network selection mode, automatically switches to another network for roaming, upon reaching a predefined maximal number of registration attempts. According to the GSM standard this maximal number is set to four, as mentioned above.

However, by introducing the additional UL message and preventing the reporting of the previous rejection message to the mobile unit/handset, the automatic switching is prevented.

As explained hereinabove, with the additional registration attempt (the automatically initiated additional UL message in the GSM example) the number of registration attempts received by the HPMN exceeds the predetermined maximal number.

As a result, the HPMN accepts the last registration attempt, as it is considered indicative to the will of the user that should be honored by the home network.

However, the mobile unit is unaware of the additional registration attempt issued by the detector 430, and only issues the maximal number of registration messages (four with the GSM standard).

That is to say, the HPMN makes a positive response, in the belief that this is the fifth registration attempt, indicating that the mobile telephone is in manual mode.

The positive response of the HPMN, received by the HPMN, is reported to the mobile unit/handset 740.

The mobile unit interprets the positive response as an affirmative answer to the last registration attempt (fourth with the GSM standard) issued by the mobile unit, and thus the selection of the VPMN is completed successfully 750.

That is to say, the attempt of the home network to redirect the selection of a roaming network, by issuing manipulative rejection messages, so as to maneuver the mobile unit into switching to another network which is preferable as far as the home HPMN operator is concerned, is successfully blocked.

Note also that the mobile unit usually has a timeout which is sufficient to allow such a successful additional iteration, as described above with the automatic sending of the additional registration message.

A simple example of the above is where only the reject message for the fourth registration attempt is being blocked, and the fifth Update Location is sent by the apparatus towards the HPMN, without reporting the mobile handset of the fourth reject. In that case, the fifth attempt is accepted by the HPMN, and an acceptance message is then forwarded to the mobile handset. Since the mobile handset timeout is usually thirty two seconds for a registration response, there is enough time for the fifth attempt to be accepted by the home network and then forwarded to the mobile handset.

Preferably, the method further includes defining a maximal number of additional registration attempts (the number of Update Location messages issued without reporting to the mobile unit), so as handle a case where error rejection messages are authentic rather than manipulative redirection attempts.

Figure 8:
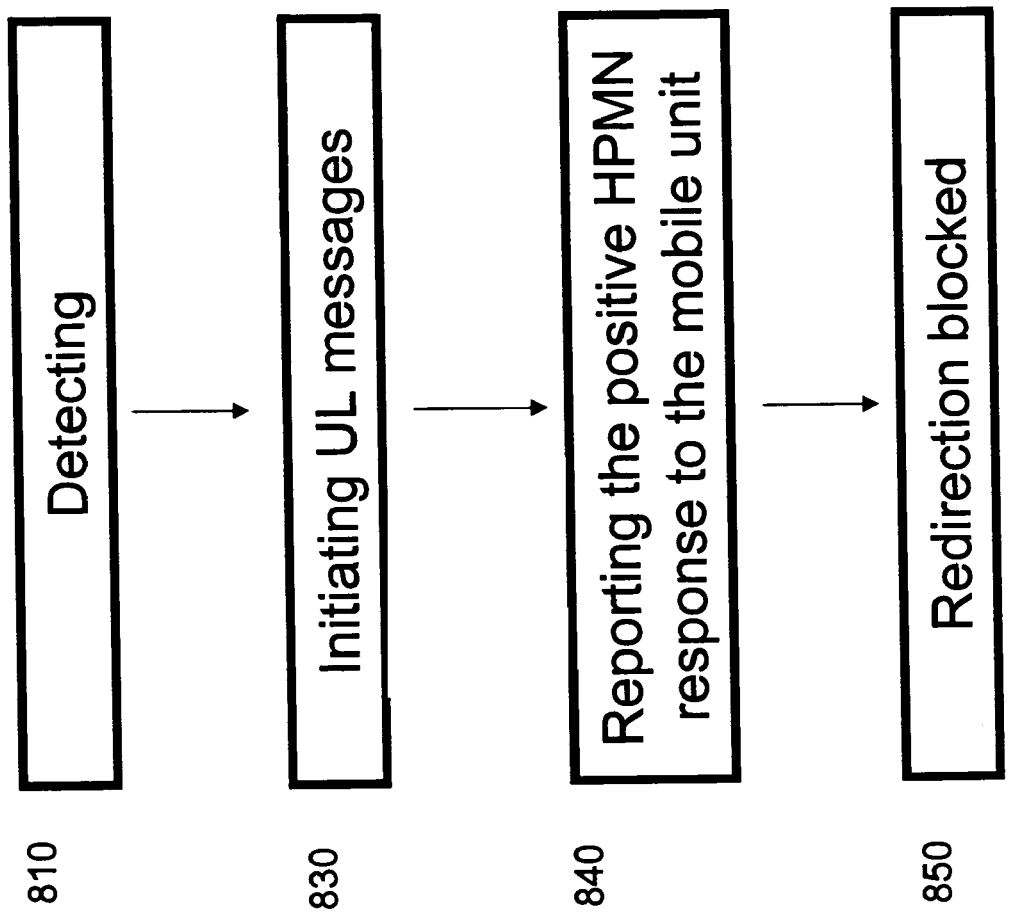
FIG. 8 is a flow diagram of a third method for blocking redirection attempts according to a preferred embodiment of the present invention.

Reference is now made to FIG. 8 which is a flow diagram of a third method for blocking redirection attempts according to a preferred embodiment of the present invention.

This preferred embodiment is a variation of the GSM exemplified embodiment explained hereinabove with FIG. 7.

Having detected 810 the roaming transaction, say by the above described detector 410, and the respective attempt at redirecting the selection of the network, the blocking is carried out in a slightly different way.

Upon detecting 810 the first MAP update location (UL) message and a first manipulative rejection message issued in response by the HPMN, a sequence of update location (UL) messages is initiated and sent to the HPMN for the same roaming transaction 830. Optionally, by the above described blocker 430.

These automatically initiated messages are composed so as to match the originally detected update location (UL) message which started the roaming transaction. Preferably, previously recorded information relating to the roaming transaction is utilized for composing the automatically initiated messages.

The automatically initiated messages are sent to the HPMN without notifying the mobile unit.

As explained hereinabove, when the number of repeated UL messages belonging to the same roaming transaction, for the same VPMN, reaches a maximal number (which is set to four by the GSM standard), an additional (fifth) UL message must be accepted by the HPMN.

The HPMN may reject the fifth attempt (and even subsequent attempts) as well, as a manual selection process includes additional attempts to reach the HPMN. The HPMN then refuses the fifth and subsequent attempts, in order to eliminate an operation of such a potential blocking apparatus installed at the VPMN, as described by this patent application. To overcome this possible HPMN function, the blocking apparatus may be configured to issue repeated registration attempts until the HPMN is enforced to accept the registration attempt, unless a timeout or a pre-defined attempt limit is reached).

As the HPMN sends an acceptance message for the additional UL message, this affirmative message is forwarded to the mobile unit 840. Consequently, the selection of the VPMN is completed successfully 850 and the attempt of the HPMN at redirecting the network selection is successfully blocked With this embodiment, the time period the user of the mobile unit has to wait until a roaming network is selected is drastically minimized, in comparison with the previous embodiment.

It usually takes 16 seconds for the mobile unit to initiate a following UL message, after the previous message is rejected.

If the timeout period of the handset does not allow the redirection blocking apparatus 400 to produce all UL messages (2nd to 5th with GSM), it may produce part of the messages (say the 4th and the $5^{th}$ in the GSM), still significantly minimizes the waiting period of the user for a successful roaming network selection.

Figure 9:
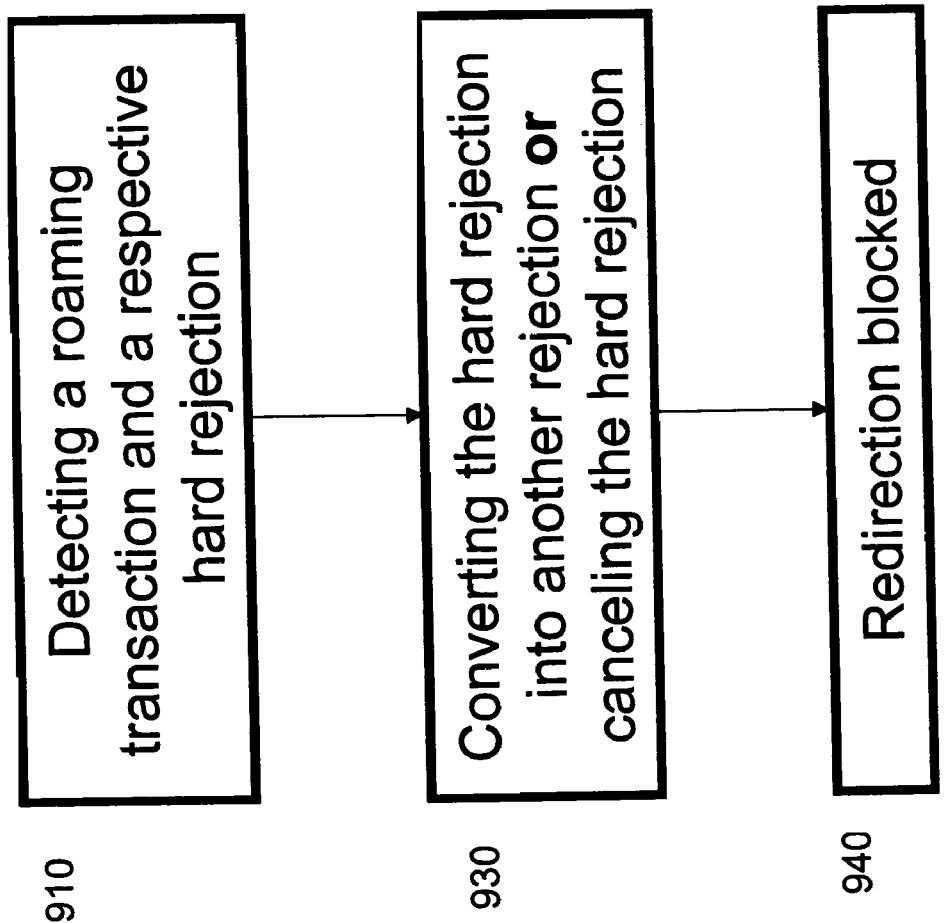
FIG. 9 is a flow diagram of a fourth method for blocking redirection attempts according to a preferred embodiment of the present invention.

Reference is now made to FIG. 9 which is a flow diagram of a fourth method for blocking redirection attempts according to a preferred embodiment of the present invention.

The home network, when attempting to redirect the selection of the network by the roaming mobile unit, may issue different types of rejection messages.

For example, with a GSM network, the home network may send any combination and order of the following types, and other rejection types: Update location reject (System failure), Provider abort, Roaming not allowed, and Ignore.

Certain rejection messages may by regarded as indicating a strong rejection. This strong rejection may result in an immediate switching of the network by the mobile unit, in accordance with an optionally preprogrammed and standard response.

For example, the "roaming not allowed" message immediately causes a mobile unit to search for another network. The HPMN operator may thus contemplate issuing a manipulative roaming not allowed message, so as to redirect the roaming user to another network. Actually, upon receiving a roaming not allowed message, a SIM card equipped mobile unit may mark the visited network as forbidden, thus preventing itself from ever returning to the visited network, even if it is the only available network.

In a preferred embodiment of the present invention, the roaming transaction and the respective redirection attempt which involves a strong rejection such as a manipulative roaming not allowed message are detected 910 and optionally recorded. The intercepted strong rejection message is then converted 930 into another type of reject message, which does not cause the mobile unit/handset to automatically switch to another network. As a result, the redirection attempt is successfully blocked 940. Alternatively, such a strong rejection message is cancelled 930 and no other rejection message is sent instead.

In a preferred embodiment, the strong rejection message is not converted to another type of rejection message if the HPMN appears in a list of known networks for which there is no roaming agreement with. That is to say, according to the list we can tell if the rejection message is real or manipulative.

Figure 10:
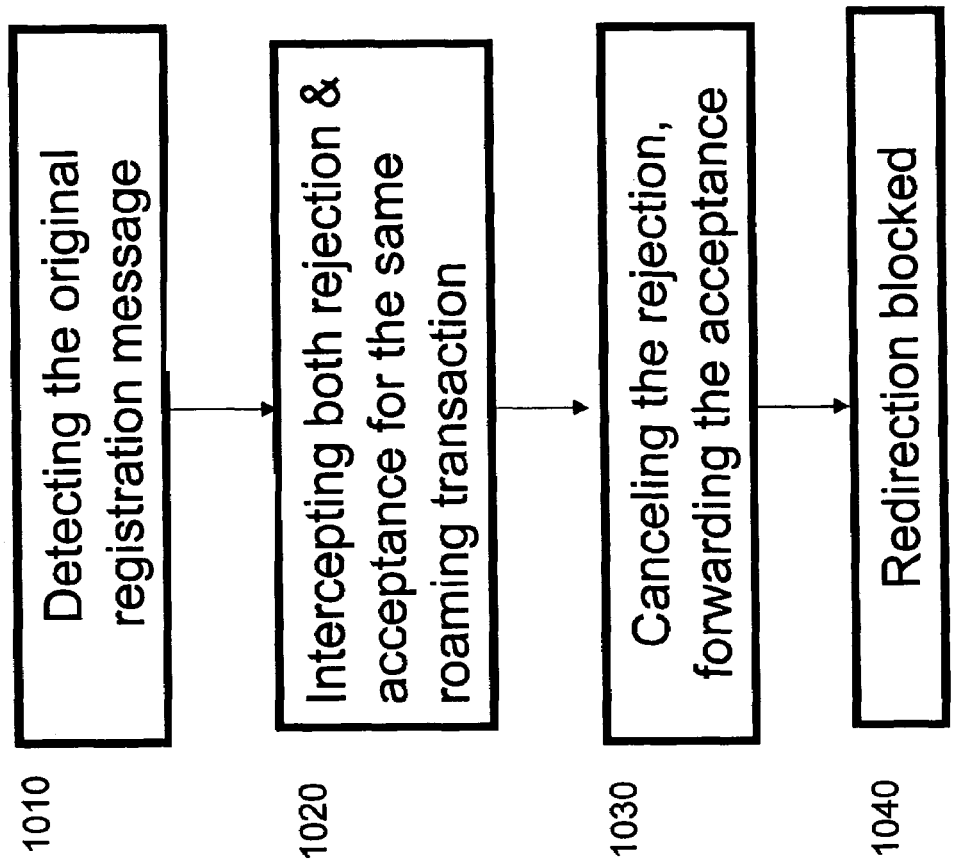
FIG. 10 is a flow diagram of a fifth method for blocking redirection attempts according to a preferred embodiment of the present invention.

Reference is now made to FIG. 10 which is a flow diagram of a fifth method for blocking redirection attempts at a visited network selection by a home network when roaming in the visited network, according to a preferred embodiment of the present invention.

In a preferred embodiment of the present invention, the original registration message is detected 1010 and preferably recorded.

When the HPMN sends a duplicate response to the original registration message initiated by the mobile unit, roaming in the visited network (VPMN), one being affirmative the other being a rejection, these contradictory messages are intercepted 1020.

However, the rejection message is cancelled and only the affirmative message is forwarded to the mobile unit 1030.

Consequently, the mobile unit stays within the VPMN, and the attempted redirection is blocked 1040.

An example for such a case is when the HPMN is installed with a redirection product which emulates the Home Location Registration (HLR) for sending manipulative reject responses for "Update Location" messages coming from a VPMN. In this example, both the actual HLR and the redirection product receive the registration message from the roaming mobile unit (Typically, the redirection product uses a SS7 probe for this purpose, monitoring the SS7 messages). Consequently, both the actual HLR and the emulating redirection product send their responses to the registration message: affirmative and negative respectively. As a result, both messages race for the mobile unit.

Figure 11:
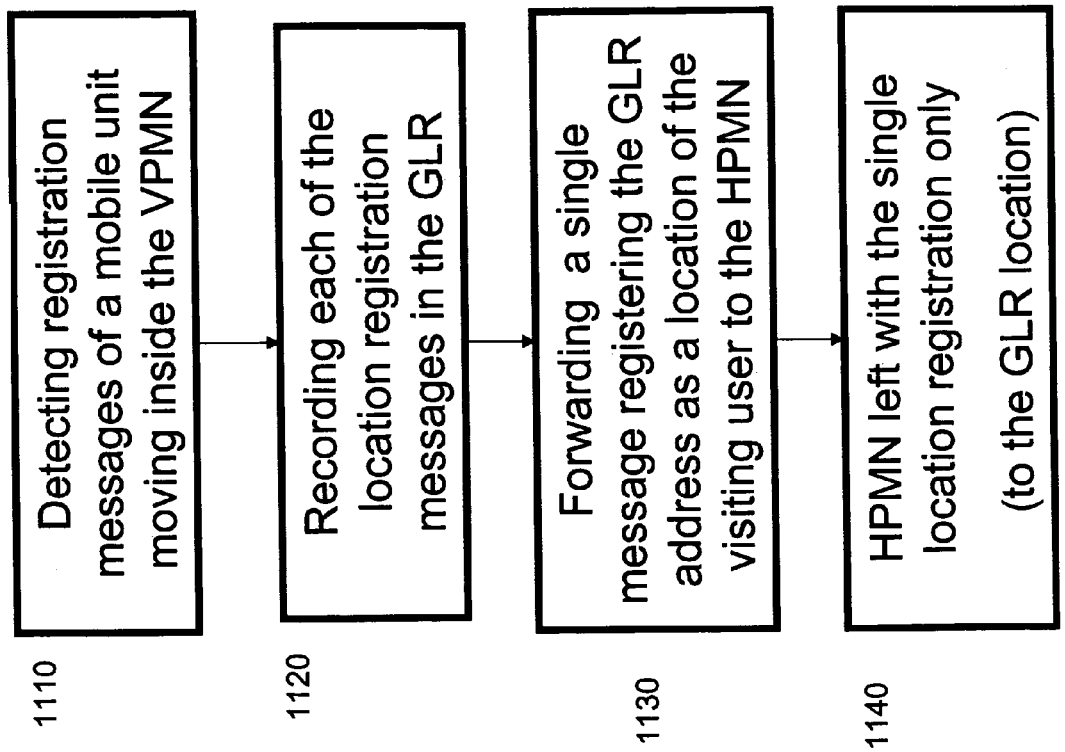
FIG. 11 is a flow diagram of a sixth method for blocking redirection attempts according to a preferred embodiment of the present invention.

Reference is now made to FIG. 11 which is a flow diagram of a sixth method for blocking redirection attempts at a visited network selection by a home network when roaming in the visited network, according to a preferred embodiment of the present invention.

In a preferred embodiment, the VPMN is equipped with a Global Location Register GLR. The GLR is a node which is positioned between the VLR and/or Serving GPRS Support Node (SGSN—responsible for the delivery of data packets from and to the mobile stations within a geographical service area.) and the HLR, which may be used to for optimizing the location updating and the handling of subscriber profile data across network boundaries. When a subscriber roams the GLR emulates the HLR towards the VLR and SGSN in the visited network and the VLR and SGSN towards the HLR in the home network. By handling most of the location procedures without involving the HPMN, it happens to have an anti-Traffic Redirection feature as well. The GLR is defined by the 3GPP standards, and is referenced by ETSI specifications 23.119, 29.119, 29.120.

With this preferred embodiment, upon detecting registration messages being issued by the mobile unit when moving between positions within the visited network 1110, each of the location registrations issued by the mobile unit is recorded only by the GLR 1120.

However, forwarding of these registration messages to the HPMN is avoided and a single message registering the GLR address as a location of the mobile unit is sent to the HPMN 1130 instead.

That is to say that with this embodiment the HPMN registers only the GLR itself as a location of the roaming abroad mobile unit 1140. This embodiment has the advantage of limiting the attempt at redirecting the selection of a visited network to the very initial stage when the unit originally registered in the visited network.

A preferred embodiment of the present invention relies on the fact that most of the redirection systems located at the HPMN are triggered according to the Update Location signaling Connection Control Part (SCCP) Numbering Plan address (E.214—Mobile Global Title).

In case the blocking system identifies an HPMN that uses a traffic redirection system, the next Update Location message is sent according to a different numbering plan (E.164—Telephony Global Title), thus by-passing the platform, and the subscriber is successfully registered.

In a preferred embodiment of the present invention, in order to speed user registration, the VPMN may also register the user at the local VLR first, before the registration is handled at the HPMN. In this case, the MAP authentication message (which is issued before the MAP Update Location) is sent to the HPMN, as usual, in order to ensure the authentication of the mobile handset. The detector then issues a MAP Restore Data (or another MAP message) towards the HLR, requesting the user profile. The user profile is then sent to the VLR via a MAP ISD message (Insert Subscriber Data).

When the Location Update is issued by the mobile handset towards the VLR, the detector accepts this registration on behalf of the VPMN, based on the subscriber profile. In parallel, the detector and the redirection blocker continues the registration process at the HPMN, as described hereinabove. This time however there is no time or max attempt limit, since the handset is already registered.

During the intermediate period, between registration at the VPMN and the HPMN, the VPMN provides the user with all requested services, such as placing telephony calls and sending SMS.

In case the registration at the HPMN can not take place after all, the VPMN removes the subscriber from its VLR, and issues a MAP PRN and FSM, as described in U.S. patent Ser. No. 10/806,281, and EP 04101190.9 in order to trigger the mobile handset to initiate another location update process, which brings about a different network selection.

A preferred embodiment of the present invention handles certain cases where the HPMN may use over the air (OTA) commands in order to influence the network selection process done by the handset. For example, see Starhome preferred network selection patent application (U.S. Ser. No. 10/806, 281, EP 04101190.9), hereby incorporated by reference.

OTA messages are sent as binary SMS messages, and therefore may be intercepted by the VPMN. The VPMN may analyze the SMS messages, distinguish these OTA messages from other SMS messages, and block them or manage them according to a policy determined by the VPMN. The interception is done using the SRM (Signaling Relay Module) component, already described by this patent application.

It is expected that during the life of this patent many relevant devices and systems will be developed and the scope of the terms herein, particularly of the terms "Mobile unit", "Mobile Handset", "HPMN", "VPMN", "VLR", "GLR", "HLR", "SS7", "MAP", "GSM", "Database" and "Detector", is intended to include all such new technologies a priori.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Apparatus associated with a visited network for blocking of redirection attempts made by a home network when a mobile unit roams in said visited network, the apparatus comprising:

a detector, configured for detecting:

a) a roaming transaction by a mobile unit of a visiting user and b) a respective redirection attempt directed at said mobile unit roaming at said visited network, the attempt being made by a home network of said visiting user; and a redirection blocker, associated with said detector and configured for blocking said detected redirection attempt, thereby preventing said redirection from occurring, such that said mobile unit successfully registers at said visited network.

2. The apparatus of claim 1, further comprising a database, associated with said detector for storing information relating to said roaming transaction and said redirection attempt.

3. The apparatus of claim 1, further comprising a service logic module, associated with said detector and said redirection blocker, configured for performing service logic for said blocking of the redirection attempt.

4. The apparatus of claim 1, wherein said blocking includes at least one of a group comprised of: canceling messages, modifying messages, and initiating messages.

5. The apparatus of claim 1, wherein said roaming transaction comprises a series of at least one registration message, initiated by said mobile unit and sent towards the home network.

6. The apparatus of claim 1, wherein said redirection attempt comprises at least one registration rejection message sent from said home network.

7. The apparatus of claim 5, wherein said roaming transaction comprises repeating said registration message following blocking by receipt of a rejection message from said home network, and wherein the redirection blocker is further configured for intercepting and canceling at least one of a plurality of repeated rejection messages, each of said rejection messages being sent from the home network in response to a respective one of said registration messages, thereby preventing redirection of the mobile unit from the visited network upon the mobile unit receiving a predetermined maximal number of rejection messages for the roaming transaction.

8. The apparatus of claim 5, wherein the redirection blocker is further configured for intercepting and canceling a registration rejection message, sent from the home network in response to a respective one of said registration messages, upon detecting a registration acceptance message, sent from the home network in response to the respective one of said registration messages.

9. The apparatus of claim 5, wherein the redirection blocker is further configured for detecting a registration rejection message sent from the home network in response to a first in the series of said registration messages, for sending a sequence of matching registration messages to the home network, and for canceling any registration rejection message, sent from the home network in response to a respective one of said sequence of matching registration messages, thereby preventing redirection of the mobile unit from the visited network upon the mobile unit receiving a predetermined maximal number of rejection messages for the roaming transaction.

10. The apparatus of claim 1, wherein said redirection blocker is further configured for intercepting a strong rejection message of said redirection attempt, the strong rejection message bearing a capacity to make the mobile unit immediately search for another network, and further configured for at least one of a group comprised of converting the strong rejection message into a rejection message that does not bear said capacity and canceling the strong rejection message.

11. The apparatus of claim 1, wherein said redirection blocker is further configured for intercepting a strong rejection message of said redirection attempt, the strong rejection message bearing a capacity to make the mobile unit immediately search for another network, and further configured for at least one of a group comprised of converting the strong rejection message into a rejection message that does not bear said capacity and canceling said redirection attempt, provided that said home network is not included in a predefined list of networks.

12. The apparatus of claim 10, wherein said strong rejection message indicates that roaming is not allowed.

13. The apparatus of claim 1, wherein said home network and said visited network are connected using a SS7 based link, and said detector is further configured for monitoring said SS7 based link.

14. The apparatus of claim 1, wherein said home network and said visited network are connected using a MAP based link, and said detector is further configured for monitoring said MAP based link.

15. The apparatus of claim 5, wherein said roaming transaction further comprises a location registration message.

16. The apparatus of claim 1, wherein said blocking further includes setting a different numbering plan than an originally set number plan for said roaming transaction.

17. The apparatus of claim 1, wherein said redirection attempt is further comprised of over the air (OTA) commands and wherein said blocking further includes one of a group comprised of canceling said OTA commands and handling said OTA commands according to a predefined policy.

18. Method for blocking of redirection attempts by a home network when a mobile unit roams in a visited network, the method comprising:
   detecting:
   a) a roaming transaction by a mobile unit of a visiting user and
   b) a respective redirection attempt of said mobile unit from said visited network by a home network of said visiting user; and
   blocking said detected redirection attempt, thereby allowing said roaming transaction at said mobile unit to succeed.

19. The method of claim 18, wherein said blocking includes at least one of a group comprised of: canceling messages, modifying messages, and initiating messages.

20. The method of claim 18, wherein said roaming transaction comprises a series of at least one registration message, initiated by said mobile unit and sent towards the home network.

21. The method of claim 18, wherein said redirection attempt comprises at least one registration rejection message sent from said home network.

22. The method of claim 18, wherein said roaming transaction comprises repeating said registration message following blocking by receipt of a rejection message from said home network, and wherein said blocking further comprises intercepting and canceling at least one of a plurality of repeated rejection messages, each of said rejection messages being sent from the home network in response to a respective one of said registration messages, thereby preventing redirection of the mobile unit from the visited network upon the mobile unit receiving a predetermined maximal number of rejection messages for the roaming transaction.

23. The method of claim 20, wherein said blocking further comprises intercepting and canceling a registration rejection message, sent from the home network in response to a respective one of said registration messages, upon detecting a registration acceptance message, sent from the home network in response to the respective one of said registration messages.

24. The method of claim 20, wherein said detecting further comprises detecting a registration rejection message sent from the home network in response to a first in the series of said registration messages, and said blocking further comprises sending a sequence of matching registration messages to the home network and canceling any registration rejection message, sent from the home network in response to a respective one of said sequence of matching registration messages, thereby preventing redirection of the mobile unit from the visited network upon the mobile unit receiving a predetermined maximal number of rejection messages for the roaming transaction.

25. The method of claim 18, wherein said blocking further comprises intercepting a strong rejection message of said redirection attempt, the strong rejection message bearing a capacity to make the mobile unit immediately search for another network, and further comprises converting said strong rejection message into a rejection message that does not bear said capacity.

26. The method of claim 18, wherein said blocking further comprises intercepting a strong rejection message of said redirection attempt, the strong rejection message bearing a capacity to make the mobile unit immediately search for another network, and further comprises one of a group comprised of converting said strong rejection message into a rejection message that does not bear said capacity and canceling the strong rejection message, provided that said home network is not included in a predefined list of networks.

27. The method of claim 25, wherein said strong rejection message indicates that roaming is not allowed.

28. The method of claim 18, wherein said home network and said visited network are connected using a SS7 based link, and said detecting further comprises monitoring said SS7 based link.

29. The method of claim 18, wherein said home network and said visited network are connected using a MAP based link, and said detecting further comprises monitoring said MAP based link.

30. The method of claim 20, wherein said roaming transaction further comprises a location registration message.

31. The method of claim 18, wherein said redirection attempt is further comprised of over the air (OTA) commands and wherein said blocking further includes one of a group comprised of canceling said OTA commands and handling said OTA commands according to a predefined policy.

32. The method of claim 18, wherein said blocking further includes setting a different numbering plan then originally set for said roaming transaction.

33. The method of claim 18, wherein said mobile unit is temporarily registered and provided services by said visited network for a predefined time duration while the method steps are carried out.

* * * * *